J. B. BAUM.
RAIL JOINT.
APPLICATION FILED JAN. 26, 1912.
1,055,965.
Patented Mar. 11, 1913.
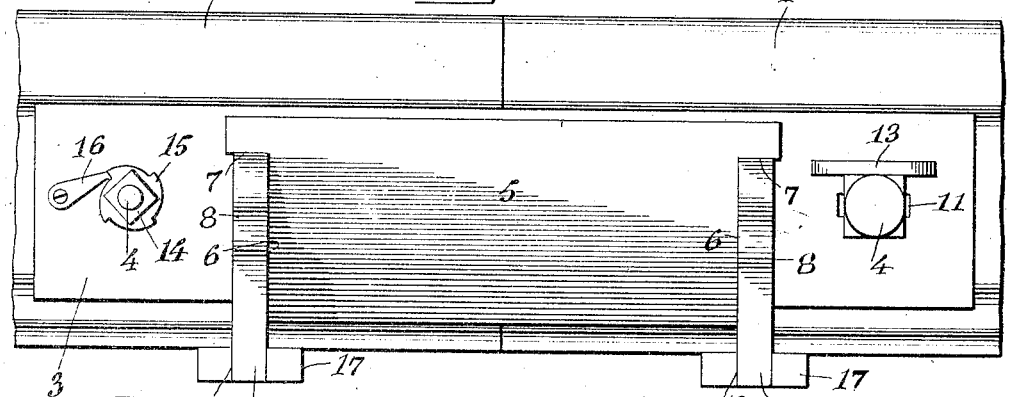
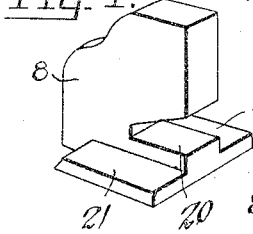
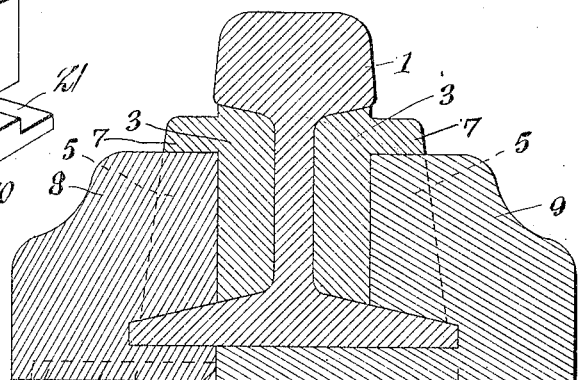
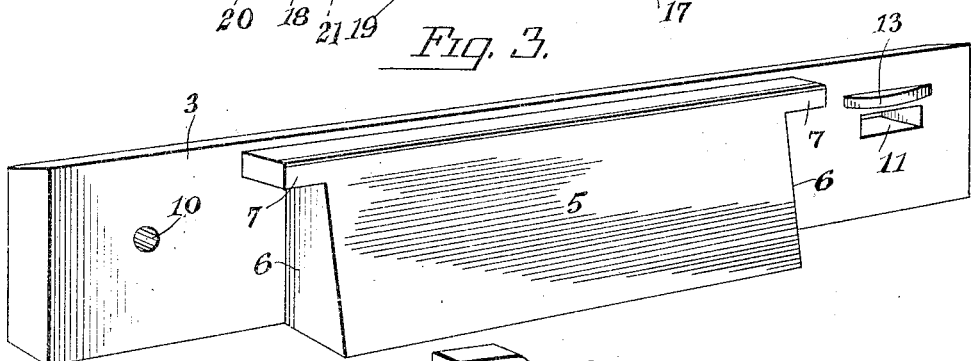
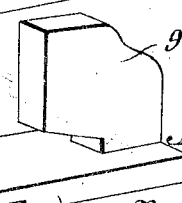
Inventor
James B. Baum
By Victor J. Evans
Attorney
Witnesses

UNITED STATES PATENT OFFICE.

JAMES B. BAUM, OF GRAND JUNCTION, COLORADO, ASSIGNOR TO THE RAILWAY SAFETY APPLIANCE COMPANY, OF GRAND JUNCTION, COLORADO.

RAIL-JOINT.

1,055,965.  Specification of Letters Patent.  Patented Mar. 11, 1913.

Application filed January 26, 1912. Serial No. 673,502.

*To all whom it may concern:*

Be it known that I, JAMES B. BAUM, a citizen of the United States, residing at Grand Junction, in the county of Mesa and State of Colorado, have invented new and useful Improvements in Rail-Joints, of which the following is a specification.

This invention relates to rail joints, the object in view being to provide a reinforced rail joint which will amply sustain the contiguous ends of the rails, and also provide means for locking the bolts and nuts which secure the fish plates in place.

With the above and other objects in view, the invention consists in the construction, combination and arrangement of parts, as will be hereinafter more fully described, illustrated in the accompanying drawings, and pointed out in the claims hereunto appended.

In the accompanying drawings: Figure 1 is a side elevation of a rail joint embodying the present invention. Fig. 2 is a vertical cross section through the same. Fig. 3 is a detail perspective view of one of the fish plates, looking toward the outer side. Fig. 4 is a perspective view of one of the chairs. Fig. 5 is a similar view of the opposite chair.

Referring to the drawings, 1 and 2 designate a pair of rail ends, 3 fish plates arranged at opposite sides thereof, and 4 the bolts which secure the fish plates to the rails.

Each of the fish plates 3 has its central portion thickened or reinforced, as shown at 5, and the end portions of the reinforce are cut-away or rabbeted, as shown at 6, so as to leave horizontal shoulders 7, against which bear the upper surfaces of oppositely arranged chairs 8 and 9, the chairs thus forming a thorough support for the fish plates at opposite sides of the rails, it being understood that two of such fish plates are employed, one the counter-part of the other.

Each of the fish plates 3 is provided at its opposite ends with holes 10 and 11, and one of said holes should be in the form of a slot extending lengthwise of the fish plate, so as to admit of the necessary expansion and contraction of the rails, due to changes in the weather. While the fish plates are the counter-part of each other, they are arranged reversely to each other, or in other words, end for end, so that the slot in the end of one fish plate registers with the hole in the other fish plate.

Just above the slot of each fish plate is an elongated shoulder 13 which lies close to one side of the head of the adjacent bolt, so as to prevent said bolt from turning. The nut 14 of the bolt is provided with a collar having ratchet teeth 15 formed therein adapted to be engaged by a pawl 16 pivotally mounted on the fish plate adjacent to the nut, as clearly shown, so that as the nut is tightened, the pawl will click in engagement with the said ratchet teeth and prevent the nut from working loose.

Two sets of chairs are used in connection with each pair of fish plates at each rail joint. One of the chairs 9 is formed integrally with the base plate 17 which extends under the rail and is provided in its under side with a recess 18, and in its end with a slot 19 adapting it to receive the other chair 8, embodying a shank 20 which fits in the slot 19, and oppositely extending flanges 21 which fit into the recess 18, whereby the chair 8 is made separable from the other chair, and at the same time held in proper relation to the fish plate, when the flanges 21 are engaged in the recess 18.

It will be understood that the fish plates fit snugly against the web of the rail between the head and bottom flange, and the reinforce 5 extends downwardly and also rests in contact with the base of the rail. The shoulders 7 are supported directly upon the chairs 8 and 9, and these chairs may be spiked or otherwise secured to the supporting ties.

What is claimed is:

1. In a rail joint, the combination of two rail ends, fish plates at opposite sides thereof provided at their upper corners with overhanging chair engaging shoulders, and sets of chairs located at the ends of the fish plates and engaging under said shoulders, each set comprising two oppositely arranged chairs, one of which embodies a base plate having an open slot therein, the other chair having a projecting shank fitting into said slot.

2. In a rail joint, the combination of two rail ends, fish plates at opposite sides thereof provided at their upper corners with overhanging chair engaging shoulders, and sets of chairs located at the ends of the fish plates and engaging under said shoulders, each set comprising two oppositely arranged chairs, one of which embodies a base plate having an open slot therein, and a recess in the bottom thereof, the other chair having a shank which fits into said slot and base flanges which fit into said recess.

In testimony whereof I affix my signature in presence of two witnesses.

JAMES B. BAUM.

Witnesses:
O. D. WILLIAMS,
R. L. BATES.